United States Patent
Fang et al.

(10) Patent No.: US 11,578,604 B2
(45) Date of Patent: Feb. 14, 2023

(54) ADHESIVE BONDED COMPOSITE-TO-METAL HYBRID VANES AND METHOD OF MANUFACTURE

(71) Applicant: Raytheon Technologies Corporation, Farmington, CT (US)

(72) Inventors: Xiaomei Fang, Glastonbury, CT (US); John D Riehl, Hebron, CT (US); George Alan Salisbury, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/185,010

(22) Filed: Feb. 25, 2021

(65) Prior Publication Data
US 2021/0293150 A1 Sep. 23, 2021

Related U.S. Application Data

(60) Provisional application No. 62/990,903, filed on Mar. 17, 2020.

(51) Int. Cl.
*F01D 5/28* (2006.01)
*B23K 26/352* (2014.01)
(Continued)

(52) U.S. Cl.
CPC ............ *F01D 5/282* (2013.01); *B23K 26/355* (2018.08); *B23K 26/3568* (2018.08);
(Continued)

(58) Field of Classification Search
CPC .......... F01D 5/282; F01D 9/041; F01D 5/148; B23K 26/355; B23K 26/3568;
(Continued)

(56) References Cited

U.S. PATENT DOCUMENTS

| 4,861,407 A | 8/1989 | Volkmann et al. |
| 5,383,985 A | 1/1995 | Coulon |

(Continued)

FOREIGN PATENT DOCUMENTS

| CN | 101613860 | 12/2009 |
| JP | 2016124024 | 7/2016 |

(Continued)

OTHER PUBLICATIONS

European Patent Office, European Partial Search Report dated Jul. 7, 2021 in Application No. 21162970.4.
(Continued)

*Primary Examiner* — Jacob T Minskey
*Assistant Examiner* — Adrianna N Konves
(74) *Attorney, Agent, or Firm* — Snell & Wilmer L.L.P.

(57) ABSTRACT

The present disclosure provides methods and systems for composite-to-metal hybrid bonded structures compromising the laser surface treatment on titanium alloys to promote adhesive bond performance. For example, a computer may be programmed to set a laser path corresponding to a predetermined geometric pattern. A laser may be coupled to the computer and apply a pulsed laser beam to a contact surface of the titanium alloy along the predefined geometric pattern. The laser may generate an open pore oxide layer on the contact surface of the substrate with a thickness of 100 and 500 nm. The open pore oxide layer may have a topography corresponding to the predefined geometric pattern. The topography may contain high degree of open pore structure and promote adhesive bond performance. Adhesive, primer or composite resin matrix may fully infiltrate into the open pore structures. Adhesive and composite laminate may co-cure to form composite-to-titanium hybrid bonded structures.

14 Claims, 9 Drawing Sheets

(51) Int. Cl.
    *F01D 9/04*     (2006.01)
    *B29C 65/00*     (2006.01)
    *C09J 5/02*     (2006.01)

(52) U.S. Cl.
    CPC .......... *B23K 26/3584* (2018.08); *F01D 9/041* (2013.01); *B29C 66/022* (2013.01); *C09J 5/02* (2013.01); *F05D 2230/13* (2013.01); *F05D 2240/12* (2013.01); *F05D 2300/174* (2013.01); *F05D 2300/603* (2013.01)

(58) Field of Classification Search
    CPC ............ B23K 26/3584; B23K 26/0093; B23K 26/0604; B23K 2101/001; B23K 2103/14; B23K 26/0622; B29C 66/022; C09J 5/02; F05D 2230/13; F05D 2240/12; F05D 2300/174; F05D 2300/603
    See application file for complete search history.

(56) References Cited

U.S. PATENT DOCUMENTS

| | | | |
|---|---|---|---|
| 6,176,959 | B1 | 1/2001 | Clarke |
| 6,488,805 | B1 | 12/2002 | Sauer |
| 6,521,052 | B2 | 2/2003 | Park et al. |
| 8,221,822 | B2 | 7/2012 | Flanagan |
| 8,987,632 | B2 | 3/2015 | Wohl, Jr. et al. |
| 9,458,728 | B2 | 10/2016 | Bruck et al. |
| 10,082,166 | B2 | 9/2018 | Sabau et al. |
| 10,105,544 | B2 | 10/2018 | Dadashian et al. |
| 11,292,084 | B2 | 4/2022 | Henrottin et al. |
| 2007/0251072 | A1 | 11/2007 | Beeson et al. |
| 2010/0296942 | A1* | 11/2010 | Jevons .................... F01D 5/282 416/229 R |
| 2013/0197628 | A1 | 8/2013 | Barcikowski |
| 2015/0151339 | A1 | 6/2015 | Bruck |
| 2016/0121591 | A1* | 5/2016 | MacAdams ......... B29C 66/0224 156/307.3 |
| 2017/0072511 | A1 | 3/2017 | DiGiovanni et al. |
| 2017/0210058 | A1 | 7/2017 | Nishikawa et al. |
| 2018/0056077 | A1 | 3/2018 | Dadashian |
| 2018/0147658 | A1* | 5/2018 | Shapiro ................ B23K 26/364 |
| 2018/0179989 | A1* | 6/2018 | Wadsworth ............... F02K 1/72 |
| 2019/0366481 | A1 | 12/2019 | Coulaud |
| 2020/0230742 | A1* | 7/2020 | Fang .................... B23K 26/067 |

FOREIGN PATENT DOCUMENTS

| | | |
|---|---|---|
| WO | 2018134508 | 7/2018 |
| WO | 2018149574 | 8/2018 |

OTHER PUBLICATIONS

USPTO; Advisory Action dated Apr. 5, 2022 in U.S. Appl. No. 16/253,958.

Xiaomei Fang, et al., U.S. Appl. No. 16/253,958, filed Jan. 22, 2019 and entitled "Method for Adhesive Bonding of Titanium Components Using a Fiber Laser System".

Xiaomei Fang, et al., U.S. Appl. No. 16/839,753, filed Apr. 3, 2020 and entitled "Laser Surface Treatment on Stainless Steel and Nickel Alloys for Adhesive Bonding".

Zimmermann, et al., "Improved Adhesion at Titanium Surfaces via Laser-Induced Surface Oxidation and Roughening", Materials Science and Engineering, vol. 558, Dec. 15, 2012, pp. 755-760.

European Patent Office, European Search Report dated Sep. 11, 2020 in Application No. 20153238.9.

Frank L. Palmieri et al, "Laser Ablative Surface Treatment for Enhanced Bonding of Ti—6Al—4V Alloy", ACS Applied materials and Interfaces, 5(4), 2013, pp. 1254-1261.

Frank L. Palmieri et al, "Laser Ablation Surface Preparation of Ti—6Al—4V for Adhesive Bonding", SAMPE Spring 2012, Electronic Conference Proceedings, May 21-24, 2012, pp. 1-13.

Frank L. Palmieri et al, "Further Investigation into the Use of Laser Surface Preparation of Ti—6al—4v Alloy for Adhesive Bonding", SAMPE Spring 2014 Electronic Conference Proceedings, May 2014, pp. 1-14.

H.T.X. Truong et al, "On the Use of Laser Ablation Treatment to Prepare Metal Surfaces for Co-Cured Hybrid Composite Laminates and the Influence of Temperature on Fracture Toughness of Hybrid Metal-PMC Interfaces", 17th International Conference on Experimental Mechanics (ICEM 17) Electronic Proceedings, Rhodes, Greece, Jul. 3-7, 2016, pp. 1-2.

USPTO, Non-Final Office Action dated Sep. 28, 2021 in U.S. Appl. No. 16/253,958.

European Patent Office, European Search Report dated Nov. 4, 2021 in Application No. 20153238.9.

USPTO, Final Office Action dated Jan. 26, 2022 in U.S. Appl. No. 16/253,958.

USPTO; Requirement for Restriction/Election dated Jun. 7, 2022 in U.S. Appl. No. 16/839,753.

USPTO, Non-Final Office Action dated May 4, 2022 in U.S. Appl. No. 16/253,958.

USPTO, Notice of Allowance dated Aug. 26, 2022 in U.S. Appl. No. 16/253,958.

USPTO, Non-Final Office Action dated Oct. 11, 2022 in U.S. Appl. No. 16/839,753.

\* cited by examiner

ADHESIVE BONDED COMPOSITE-TO-METAL HYBRID VANES AND METHOD OF MANUFACTURE

CROSS-REFERENCE TO RELATED APPLICATIONS

This application is a non-provisional of, and claims priority to, and the benefit of U.S. Provisional Application No. 62/990,903, entitled "ADHESIVE BONDED COMPOSITE-TO-METAL HYBRID VANES AND METHOD OF MANUFACTURE," filed on Mar. 17, 2020, which is hereby incorporated by reference in its entirety.

FIELD OF THE DISCLOSURE

The present disclosure relates to the method of manufacturing composite-to-metal hybrid bonded structures comprising metal body, laser treated metal surface, composite body.

BACKGROUND OF THE DISCLOSURE

Composite-to-titanium adhesively bonded structures require high bond performance and consistent bond quality. Surface structures and surface chemistry on pre-bond metal substrates are important for adhesive bond performance and durability. An oxide layer with micro-level or nano-level open-pore structures is desirable to form strong bonding with aerospace-rated organic adhesives, primers or composite resin matrices. An oxide layer allows for the formation of chemical bond between metal substrate and organic adhesives/primers/composite resin matrices. High degree of open pore structures and increased micro-level roughness enhance the mechanical interlocking of adhesives/primers/composite resin matrices. Traditionally, abrasion, chemical etching and anodizing processes have been used as standard processes for metal substrates prior to bonding. However, bond quality from grit blast is often inconsistent, consequently risk in durability may become high. Etching and anodizing processes are wet chemistry batch processes and tend to use large quantities of hazard chemical solutions for immersion of entire parts.

SUMMARY OF THE DISCLOSURE

A method for surface treating a titanium alloy vane prior to adhesive bonding is disclosed herein. The method may comprise: determining, by a processor, a predetermined set laser path corresponding to a predefined geometric pattern; commanding, by the processor, a laser to apply a pulsed laser beam to a contact surface of the titanium alloy vane along the predefined geometric pattern, the pulsed laser beam configured to contact the contact surface at a substantially normal angle relative to the contact surface.

In various embodiments, the method may further comprise prior to the commanding, by the processor, coupling the laser to a computer numeric control (CNC) tool. The predetermined set laser path may be a three-dimensional path corresponding to the predefined geometric pattern of the contact surface, wherein the contact surface has a complex three-dimensional surface. The predefined geometric pattern may comprise at least one of a linear array pattern, a perpendicular crosshatch pattern, or a rotating linear array. A topography of the contact surface after applying the pulsed laser beam to the contact surface may be substantially more uniform relative to an alkaline etching surface treatment. Applying the pulsed laser beam to the contact surface may further comprise forming an open pore oxide structure on the contact surface. The laser may be configured to travel along a three-dimensional path and surface treat a complex three-dimensional surface.

A method of manufacturing a composite-to-metal hybrid vane is disclosed herein. The method may comprise: treating a surface of a vane with a pulsed laser, the vane comprising a titanium alloy; generating a porous oxide layer on a contact surface of the vane; infiltrating the porous oxide layer with at least one of an adhesive, primer, or composite resin matrix; and coupling a composite laminate to the vane.

In various embodiments, coupling the composite laminate to the titanium alloy may further comprise co-curing the composite laminate and the adhesive. In various embodiments, coupling the composite laminate to the titanium alloy may further comprise secondary bonding of the composite laminate with the adhesive. The method may further comprise applying the composite laminate to the adhesive prior to coupling the composite laminate to the vane. Applying the composite laminate to the adhesive may further comprise applying the composite laminate via resin transfer molding. Applying the composite laminate to the adhesive may further comprise applying the composite laminate via autoclave processing. Applying the composite laminate to the adhesive may further comprise applying the composite laminate via compression molding.

A composite-to-metal hybrid vane is disclosed herein. The composite-to-metal hybrid vane may comprise: a titanium alloy including a contact surface, the contact surface including an open pore oxide structure having a topography with a height between 5 nm and 2000 nm; an adhesive infiltrating the open pore oxide structure; and a composite laminate bonded to the titanium alloy.

In various embodiments, the topography of the contact surface may be substantially more uniform relative to an alkaline etching surface treatment. The open pore oxide structure may include a pore distance between 0.05 and 1 µm. The topography may include a plurality of linear arrays. Each linear array may further comprise a width less than 25 µm, and a spacing between each linear array is between 10-50 µm. The topography may include a perpendicular crosshatch pattern.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with gas turbine engines. However, various aspects of the disclosed embodiments may be adapted for optimized performance in a variety of engines or other applications. As such, numerous applications of the present disclosure may be realized.

Figure 1:
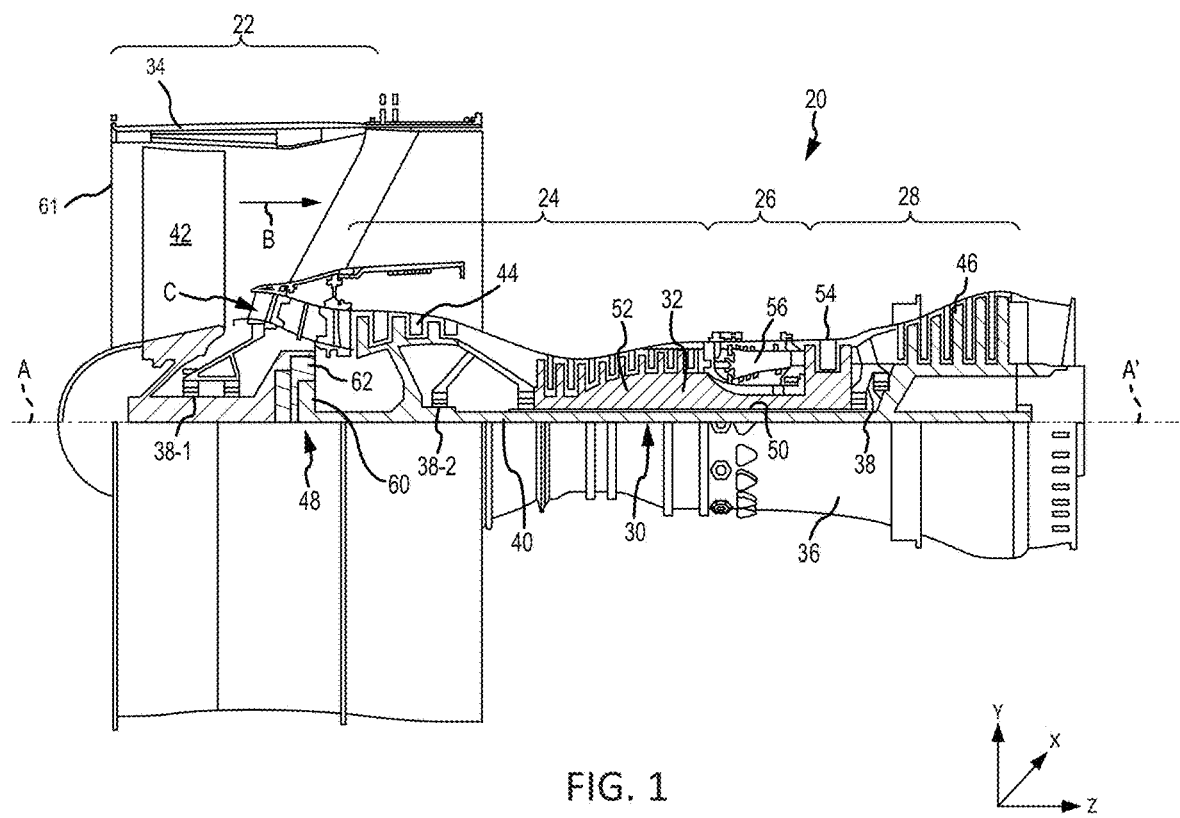
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. A fan case 34 may surround fan 42. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive respective low speed spool 30 and high speed spool 32 in response to the expansion.

In various embodiments, the low pressure compressor 44, the high pressure compressor 52, the low pressure turbine 46, and the high pressure turbine 54 may comprise one or more stages or sets of rotating blades and one or more stages or sets of vanes axially interspersed with the associated blade stages but non-rotating about engine central longitudinal axis A-A'.

Figure 2:
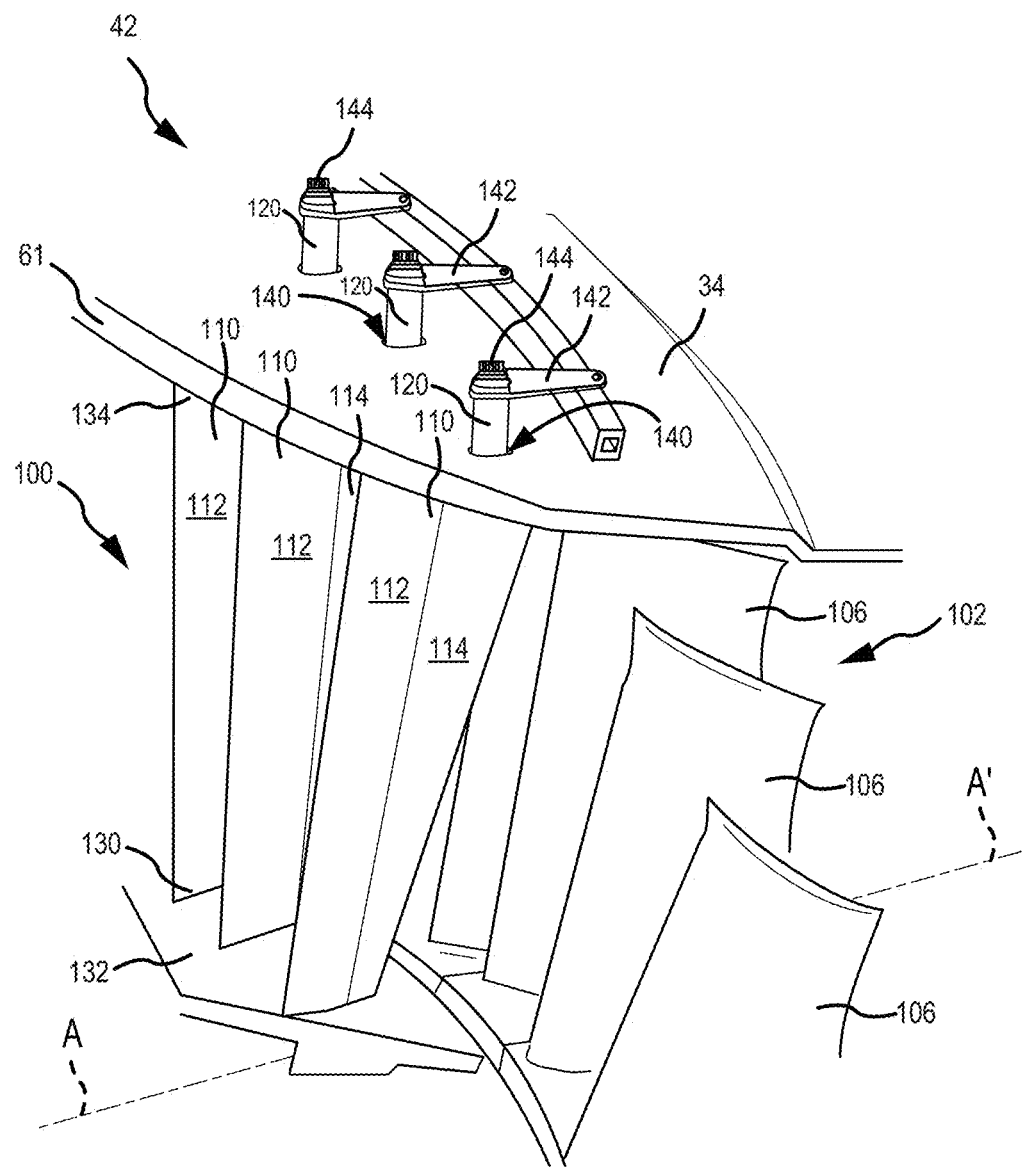
FIG. 2 illustrates a perspective view of a portion of a fan section of a gas turbine engine having a variable vane assembly configured for non-axisymmetric actuation, in accordance with various embodiments.

With reference to FIG. 2, a forward (or inlet) section of fan 42 is depicted in greater detail. Fan 42 may include one or more rotor assemblies (stages) 102. Rotor assemblies 102 may each comprise a plurality of blades 106 configured to rotate about engine central longitudinal axis A-A'. In various embodiments, a variable vane assembly 100 may be located at forward (or inlet) end 61 of fan case 34. Stated differently, variable vane assembly 100 may be located forward of the forwardmost rotor assembly 102 of fan 42. Variable vane assembly 100 may comprise a plurality of vanes 110 circumferentially spaced about engine central longitudinal axis A-A'. Vanes 110 direct fluid to blades 106. As described in further detail below, vanes 110 may be variable, meaning that a stagger angle of, at least, a portion of vane 110 may be changed to distribute fluid flow evenly about engine central longitudinal axis A-A'.

A strut portion 112 of vanes 110 may be attached at a radially inward or (or first) end 130 to an inner diameter (ID) shroud 132, and at a radially outward (or second) end 134 to fan case 34. In various embodiments, fan case 34 may define a plurality of vane stem slots 140. Vane stem slots 140 are circumferentially distributed around fan case 34. Vane stems 120 may be located through vane stem slots 140. Vanes stems 120 may protrude radially outward from the vane stem slots 140. In various embodiments, a vane arm 142 may be coupled to each vane stem 120. In various embodiments, a fastener 144 may couple vane arm 142 to vane stem 120.

Fastener 144 may comprise a screw, nut and bolt, clip, rivet, or other suitable attachment component. In various embodiments, the vane arm 142 extends approximately perpendicular to the vane stem 120 (e.g., in an axial direction). As used in the previous context, "approximately perpendicular" means ±5° from perpendicular. Vane 110 may include a strut portion 112 and a flap portion 114. Strut portion 112 may form a leading edge of vane 110. Flap portion 114 may form a trailing edge of vane 110. In accordance with various embodiments, flap portion 114 may be configured to pivot relative to strut portion 112.

An airfoil, such as a vane 110, may be comprised of a fiber metal laminate ("FML"). An FML is a structural material comprising layer(s) of composite material among layer(s) of metal. Such a structure allows the FML to have the strength properties of the metal comprised in the metal layers, along with the properties associated with the composite material layers, such as corrosion resistance, low density, elasticity, and/or fatigue, among others, that are more advantageous than those properties associated with metals. As used herein, unless stated otherwise, "metal" may refer to an elemental metal and/or a metal alloy.

Figure 3:
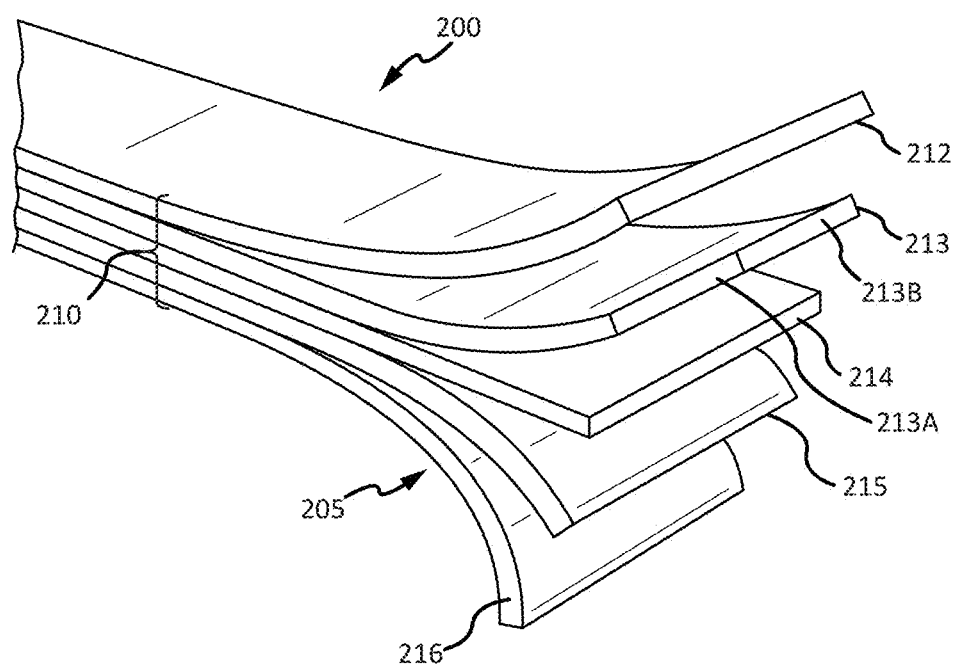
FIG. 3 illustrates a perspective, semi-exploded view of a fiber metal laminate, in accordance with various embodiments.

With reference to FIG. 3, an FML 200 may comprise FML layers 205 in a stack 210, comprising at least one metal layer and at least one composite material layer. In various embodiments, metal layers may alternate with composite material layers in stack 210 of FML layers 205. For example, layers 212, 214, and/or 216 may comprise metal, and layers 213 and 215 may comprise composite material. In various embodiments, the outer layers of FML 200, layers 212 and 216 in FIG. 2, may comprise metal layers. In various embodiments, the outer layers of FML 200, layers 212 and 216 in FIG. 2, may comprise composite material. In various embodiments, FML layers 205 may comprise a metal layer adjacent to another metal layer and/or a composite material layer adjacent to another composite metal layers. FML layers 205 of FML 200 may be arranged in any suitable arrangement, in addition to the arrangements described herein.

In various embodiments, one or more of FML layers 205 of FML 200 may be split, such as layer 213. Layer 213, for example, may comprise a first portion 213A and a second portion 213B. First portion 213A may comprise the same or different material than second portion 213B. For example, first portion 213A may comprise metal while second portion 213B may comprise composite material, or vice versa. Such a split configuration, such as layer 213, may be referred to as a mixed layer. A mixed layer may comprise any number of different materials. In various embodiments, the layers adjacent to a mixed layer, such as layers 212 and 214 in FIG. 2, may be an FML layer 205 comprising a single material, or may be a mixed layer. Layers 212 and 214 may both comprise a metal layer, both comprise a composite material layer, or layers 212 may comprise a metal while 214 may comprise a composite material, or vice versa.

In various embodiments, an FML may comprise one or more stacks 210 of FML layers 205 comprising any suitable arrangement of FML layers 205, for example, the arrangements described herein.

In various embodiments, a metal layer in FML 200 may comprise a metal or metal alloy. In various embodiments, a metal layer in FML 200 may comprise titanium metal, or the like. In various embodiments, a metal layer in FML 200 may comprise any titanium alloy, such as a titanium alloy comprising, by weight, 5.5-6.75 percent aluminum, 3.5-4.5 percent vanadium, a maximum of 0.25 percent iron, 0.2 percent oxygen, 0.08 percent carbon, 0.015 percent hydrogen, 0.05 percent nitrogen, with the remainder being titanium, commonly known by the industry standard designation of Titanium 6Al-4V (e.g., that specified by the ASTM F1472 specification, also known as Grade 5 Titanium), and hereinafter referred to as "Titanium 6Al-4V." In various embodiments, a metal layer in FML 200 may comprise any titanium alloy, for example, any alpha-beta titanium alloy, and titanium alloys known as Grades 6 through 38.

In various embodiments, FML layers 205 comprising composite material may comprise any composite material such as carbon fiber, fiber-reinforced polymer (e.g., fiber glass), para-aramid fiber, and/or aramid fiber. In various embodiments, in which an FML comprises metal layers comprising titanium and/or a titanium alloy, the composite material layers in the FML may comprise carbon fiber, such as graphite fiber. The combination of a metal layer comprising titanium and a composite material layer comprising carbon fiber may occur because titanium and carbon fiber do not form a galvanic cell, and therefore, galvanic corrosion may not occur. An FML comprising titanium and/or a titanium alloy and graphite fiber is commonly known in the industry as "TiGr." In various embodiments, in which an FML comprises metal layers comprising aluminum and/or an aluminum alloy, the composite material layers in the FML may comprise fiber-reinforced polymer (e.g., fiber glass), para-aramid fiber, and/or aramid fiber. The combination of a metal layer comprising aluminum and a composite material layer comprising fiber glass and/or aramid fiber may occur because aluminum and fiber glass and/or aramid fiber do not form a galvanic cell, and therefore, galvanic corrosion may not occur. An FML comprising aluminum and/or an aluminum alloy and fiber glass is commonly known by the industry standard designation of "GLARE."

Though FMLs described above include specific examples of metals, metal alloys, and/or composite materials, it would not be outside the scope of this disclosure to include any FML comprising any metal, metal alloy, and/or composite material, in any arrangement of layers.

In various embodiments, FML layers 205 and/or stacks 210 of FML layers 205 may be coupled together using an adhesive material or a composite resin matrix. In various embodiments, the adhesive material may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven. In various embodiments the adhesive material may comprise an amine cured, toughened epoxy resin system supplied with unidirectional and/or woven carbon or glass fibers.

Figure 4:
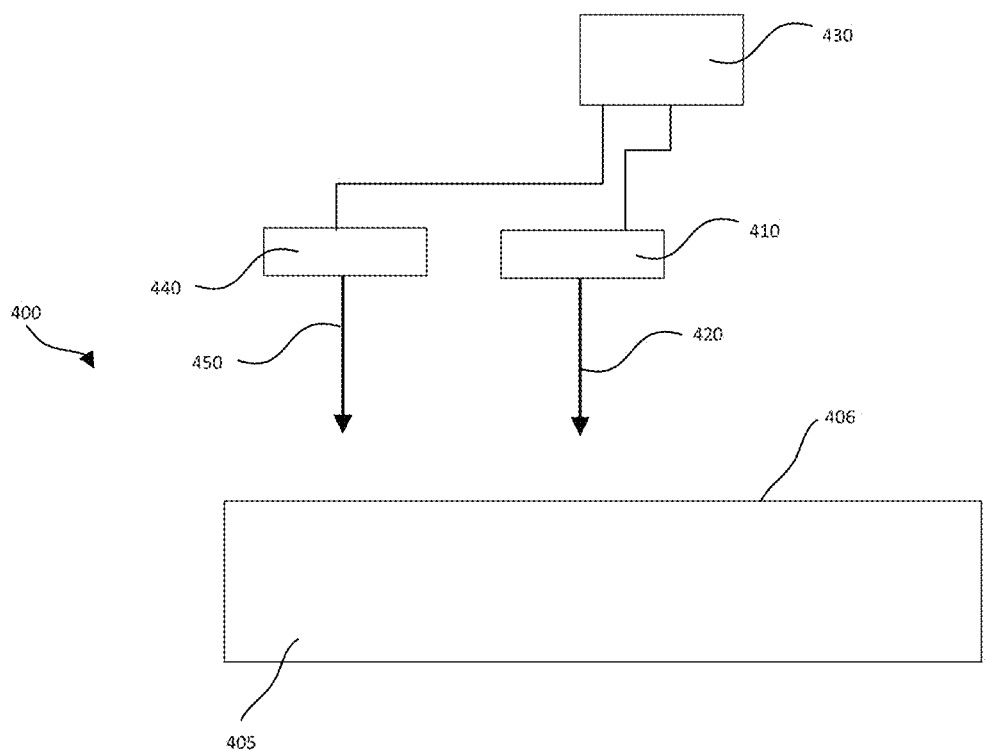
FIG. 4 illustrates a system of laser treating a substrate, in accordance with various embodiments.

Referring to FIG. 4, in accordance with various embodiments, a system of laser surface treatment of a substrate 400 is depicted comprising a substrate 405, a first laser 410, a first laser beam 420, a second laser 440, and a second laser beam 450. The substrate 405 may comprise a metal, metal alloy, or any other suitable material. The substrate 405 may be a titanium alloy, such as Titanium 6Al-4V, or the like.

A substrate contact surface 406 of the substrate 405 may be treated in preparation for adhesive bonding or coupling to a second substrate. Titanium alloys may be surface treated directly with a first laser beam 420 that is transmitted from a first laser 410 and a second laser beam 450 that is transmitted from a second laser 440 and directed toward the substrate contact surface 406 of the substrate 405. In various embodiments, the first laser 410 may comprise a fiber laser or a YAG Laser. In various embodiments, the first laser 410 and/or the second laser 440 may each comprise a YAG laser source or fiber laser source. In various embodiments, the first laser 410 and/or the second laser 440 may be operated in a pulsed mode having a wavelength, λ, of between 150 nm and 12,000 nm. In various embodiments, the laser may be operated in a pulsed mode having a wavelength, λ, of between 350 nm and 1100 nm, or between 100 nm and 400 nm. Any laser operation mode in the art may also be utilized, such as a continuous wave mode, or any other mode known in the art. In various embodiments, the first laser beam 420 and/or the second laser beam 450 shape and size are not critical to the process and can be any available combination, for representative purposes, the laser spot size may be round and about 25 to 50 μm in diameter with proper focus lens. In various embodiments, the single-pulse energy may range from 0.2 mJ and 1.0 mJ. In various embodiments, the pitch may be between 0.01 mm and 0.05 mm. In various embodiments, the laser speed, defined as the linear speed of the laser as it travels along a predetermined path, may be between 0.5 $cm^2/s$ and 50 $cm^2/min$. In various embodiments, the laser speeds may be between 2 $cm^2/min$ and 35 $cm^2/min$.

By varying the laser speed and the laser power, a desired topography on substrate contact surface 406 may be achieved. If the laser power is too high, the oxide formation and open-pore structures may be different, and an undesirable topography, such as solid oxide layer rather than open-pore structure or lack of oxide layer may be produced. If the laser power is too low, then the first laser beam 420 and/or the second laser beam 450 may not be strong enough to interact with metal surface to form the desirable oxide layer and generate open-pore topography of the substrate. Similarly, if the speed of the first laser beam 420 and/or the second laser beam 450 are too low, an undesirable topography is achieved because of overheat locally. Overheat can cause melting of a metal substrate beyond surface level. If the speed of the first laser beam 420 and/or the second laser beam 450 are too fast, an undesirable topography is achieved because insufficient energy cannot produce open-pore oxide structure. By treating the contact surface 406 of the substrate 405 with a first laser 410 and/or a second laser 440, a pre-bond surface with highly increased surface area and high degree of open-pore oxide layer is formed on the substrate contact surface 406. In various embodiments, substrate contact surface 506 may be flat, curved, rounded, concave, and/or convex.

In various embodiments, the first laser 410 and/or the second laser 440 may be coupled to a computer 430. Computer 430 may be programmed to control the position and speed of the first laser 410 and/or the second laser 440. Although shown as controlling the first laser 410 and/or the second laser 440, in various embodiments, a computer may be coupled a robot/servomotor that is coupled to the substrate 405 and programmed to control the position of the substrate 405 while the first laser 410 and/or the second laser 440 remain stationary. In various embodiments, the first laser 410 and/or the second laser 440 may be moved manually during operation. In various embodiments, the substrate 405 may be moved manually during operation. In various embodiments, by having multiple lasers (e.g., first laser 410 and second laser 440), productivity may be enhanced during manufacturing.

Figures 5A, 5B:
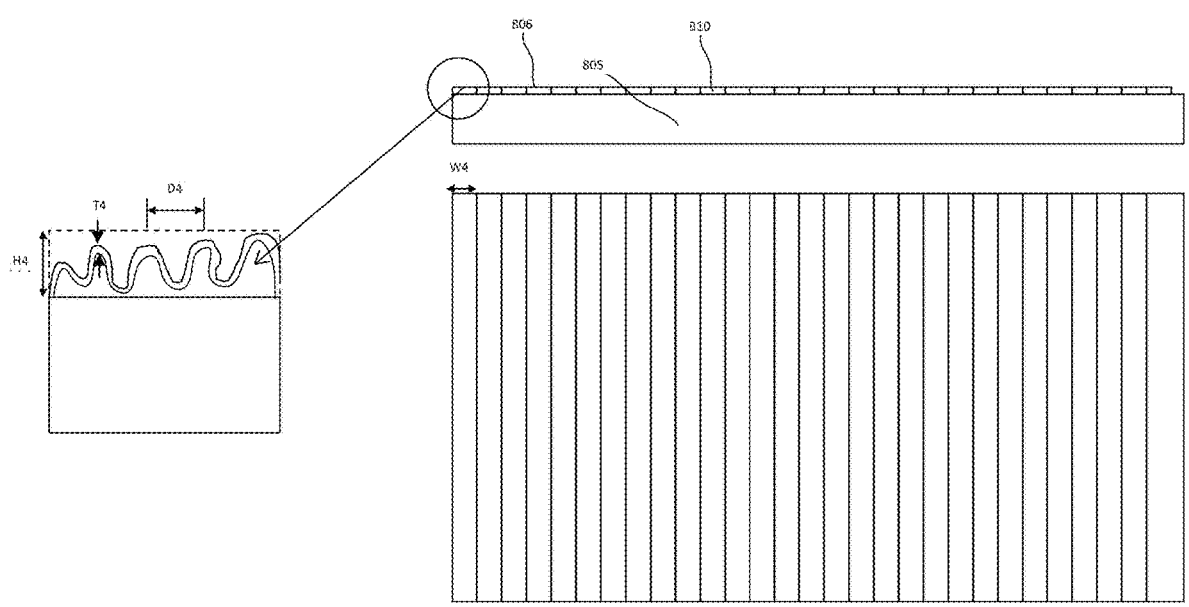
FIGS. 5A and 5B illustrate a front view and a top view of a substrate after laser treating, in accordance with various embodiments.

Referring now to FIGS. 5A and 5B, a side view and a top view of a topography comprising an overlapping linear array is depicted. In various embodiments, a substrate 805 may have a plurality of overlapping linear arrays 810 having a width W4. In various embodiments, the height H4 may be between 5 nm to 2000 nm. In various embodiments, the height H4 may be between 100 nm to 500 nm. In various embodiments, substrate contact surface 806 may be flat, curved, rounded, concave, and/or convex. In various embodiments, the width W4 may be less than 40 μm. In various embodiments, the width W4 may be less than 25 μm. In various embodiments, within each array there may be multiple peaks being spaced by a distance D4. In various embodiments, distance D4 may be less than 5 μm. In various embodiments, the distance D4 may be less than 1 μm. In various embodiments, each array 810 may have a thickness T4. The thickness T4 may be between 0.05 to 1 μm.

Laser surface treatment, as described above, may provide excellent adhesive bond performance on titanium alloy surfaces. In various embodiments, adhesive bond performance of titanium alloys, after laser surface treatment, may show significant improvement in crack resistance. Laser surface treatment may also provide 100% cohesive failure mode of a substrate, resulting in desirable bond characteristics.

In various embodiments, laser treated titanium alloys may exhibit oxide layers formed at a macro-roughness and a micro-roughness. In various embodiments, the entire contact surface of a substrate may be treated. The oxide layers may form in the spacing to allow a nano-scale porous oxide layer to form on the substrate contact surface 406 and allow strong chemical interaction and additional mechanical interlocking to enhance adhesive bonding. In various embodiments, a primer, or adhesive, or composite resin matrix may fully infiltrate into the porous oxide layers. An additional benefit of laser surface treatment may be the removal of surface contaminants during the ablation process. In various embodiments, laser surface treatment, as described herein, may provide an automated and flexible surface treatment process to manufacture adhesively bonded structures, especially for airfoil contours. In various embodiments, laser treatment may replace alkaline etch process and/or avoid large quantities of chemicals in manufacturing. In various embodiments, a priming process may become optional during manufacturing.

Figure 6:
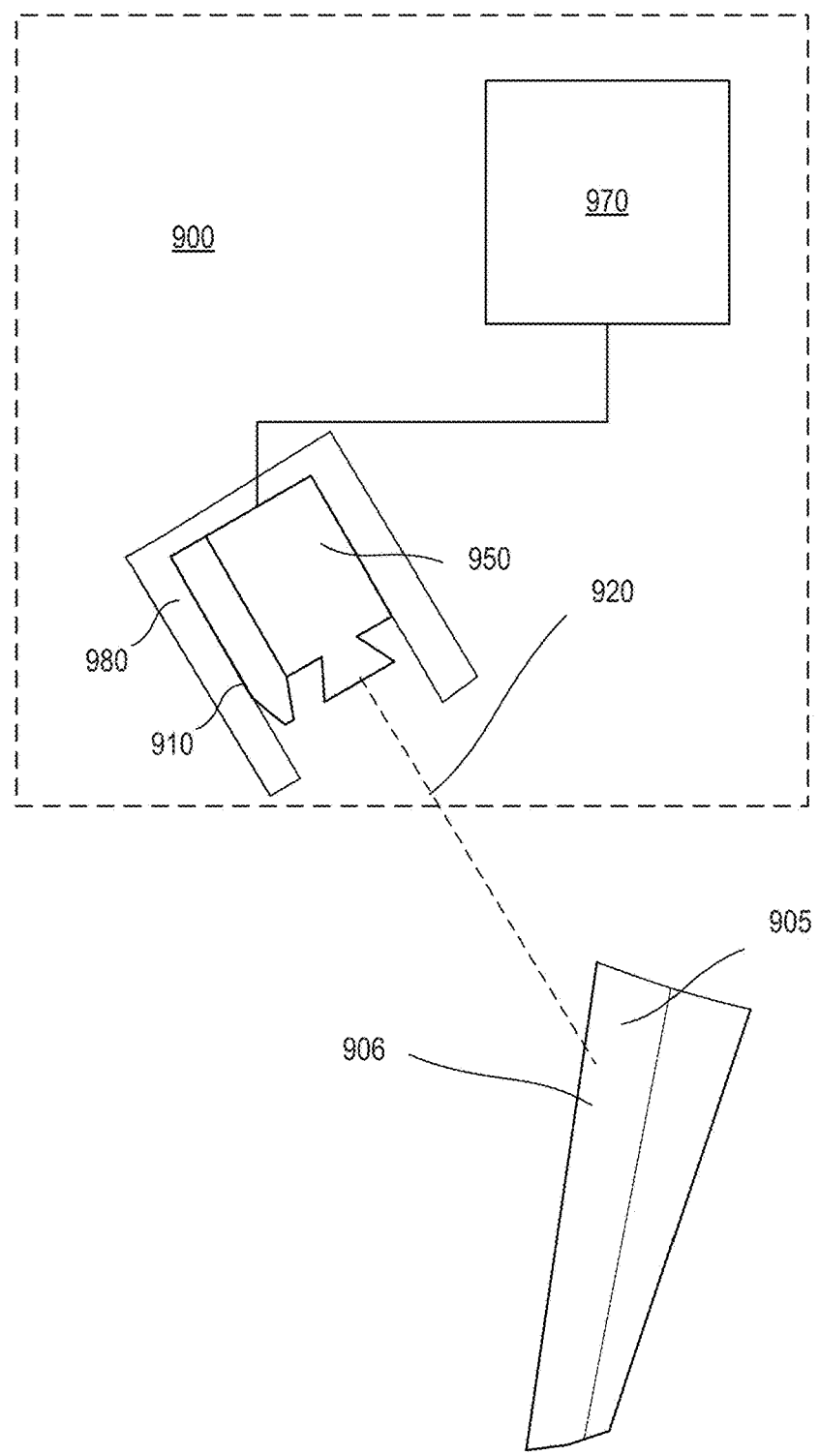
FIG. 6 illustrates a system for laser treating a vane, in accordance with various embodiments.

Referring to FIG. 6, in accordance with various embodiments, a system 900 of laser surface treatment of a vane is depicted. The laser surface treatment system may comprise a computer numeric control (CNC) tool 950, a laser 910, and a computer 970. Although illustrated with a single laser (e.g., laser 910), a plurality of lasers, as illustrated in FIG. 3 is within the scope of this disclosure. The laser 910 and the CNC tool 950 may be electrically connected to the computer. In various embodiments, the system 900 may be used to laser surface treat a vane 905. The vane 905 may comprise a contact surface 906. In various embodiments, the vane 905 or airfoil attachment may be comprised of a titanium alloy, for example, Titanium 6Al-4V.

A pulsed laser beam 920 may be directed at contact surface 906. The pulsed laser beam 920 may ablate portions of the contact surface 906 as described in the description when discussing FIG. 3. The pulsed laser beam 920 may be released from laser 910, which may comprise any laser described herein in the description of the first laser 410 and/or the second laser 440 for FIG. 4.

In various embodiments, a laser 910 may be coupled to and/or coaxial with a CNC tool 950. The CNC tool may be coupled to a computer 970. Thus, in response to CNC tool 950 being programmed to center on a specific location, such as location to be ablated, the laser 910 may be focused on the specific location. A shroud 980 may surround laser 910 and CNC tool 950. The shroud 980 may ensure that anyone operating the system 900 may be protected from the pulsed laser beam 920.

The contact surface 906 may comprise a complex three-dimensional surface, such as a convex surface, a concave surface, a curved surface, or the like. In various embodiments, the contact surface 906 may comprise a pressure side of an airfoil. In various embodiments, the contact surface 906 may comprise a suction side of an airfoil. In various embodiments, the blade contact surface may comprise a leading edge of an airfoil. In various embodiments, the computer may be programmed to ensure that the laser 910 remains substantially normal to the contact surface 906 during operation. In various embodiments, substantially means plus or minus 10° in relation to the contact surface 906. The computer may be programmed with a predefined geometric pattern for the contact surface 906. In various embodiments, the predefined geometric pattern may comprise a linear array pattern, a perpendicular crosshatch pattern, a rotating linear array, a full surface linear array (FIGS. 5A and 5B) or any other pattern commonly known in the art. In various embodiments, the predefined geometric pattern may be applied to a portion of the contact surface 906. The portion of the contact surface 906 may be a portion that may be adhesively bonded to a second component. In various embodiments, the topography of the contact surface 906 may be configured to be adhesively bonded to a second component. Examples of the second components including leading edge sheath, tip cap and other adhesively bonded attachments. The topography of contact surface 906 may also be also configured for other pre-bond surfaces of adhesively bonded structures used in structural guide vane, fan inlet case, imbedded bushing support and dissimilar material co-molding parts.

Figure 7:
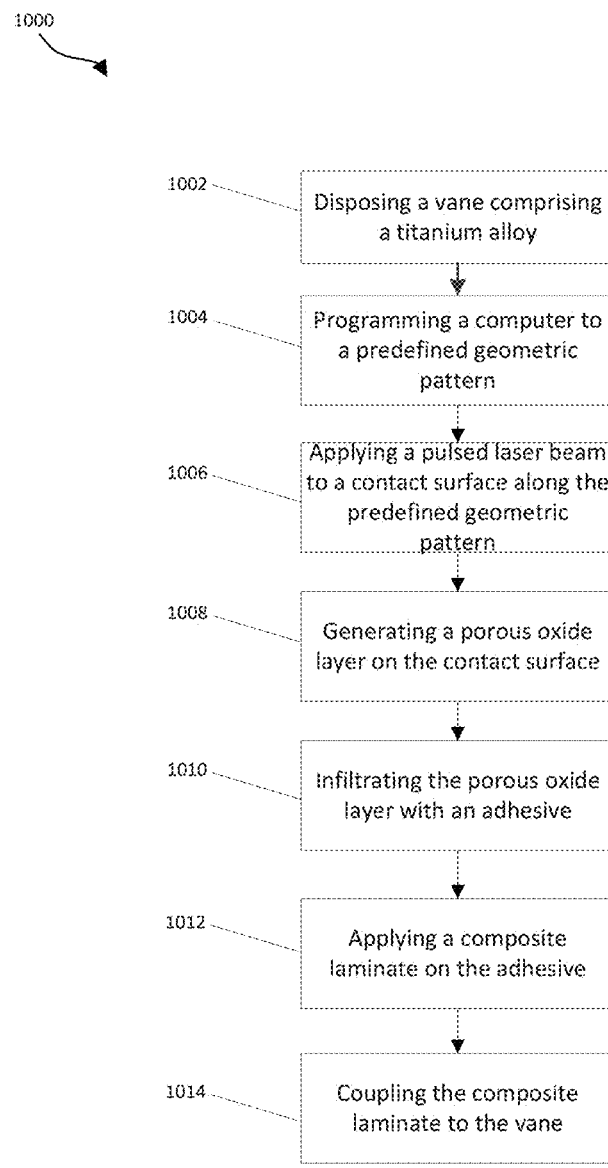
FIG. 7 illustrates a block diagram depicting a method for laser treating a vane, in accordance with various embodiments.

FIG. 7 illustrates a block diagram depicting a method 1000 of manufacturing a composite-metal hybrid vane, in accordance with various embodiments. With combined reference to FIG. 4, laser treating a substrate 405 comprising a titanium alloy, such as Titanium 6Al-4V under a first laser 410 and/or a second laser 440 (step 1002). In various embodiments, the substrate 105 may be disposed under a system comprising a CNC tool coupled to a laser, as depicted in FIG. 6. In various embodiments, the CNC tool may be coupled to a computer.

In various embodiments, a computer may be programmed to define a path for the laser to travel (step 1004). The path may correspond to a predefined geometric pattern corresponding to a desired topography of the contact surface. For example, the predefined geometric pattern may comprise a linear array pattern, a perpendicular crosshatch pattern, a rotating linear array, or any other pattern commonly known in the art. In various embodiments, the predefined pattern may be defined on a flat surface or a complex three-dimensional surface.

In various embodiments, a program may be run on the computer that applies a pulsed laser beam to a contact surface along the predefined geometric pattern (step 1006). The pulsed laser beam may be directed normal to the contact surface. In various embodiments, the operation may generate a highly open-pore oxide layer on the contact surface (step 1008). The highly porous oxide layer may comprise a topography corresponding to the predefined geometric pattern.

In various embodiments, the method may further comprise infiltrating the highly open-pore oxide layer with an adhesive (step 1010). In various embodiments, infiltrating the highly open-pore oxide layer may further include infiltrating the open pore oxide layer with or without primer. In various embodiments, the method may further comprise applying a composite laminate on an adhesive surface of the adhesive (step 1012). The step 1010 can be skipped and the step 1012 can be applied directly after the completion of the step 1008. The composite laminate may be applied with resin transfer molding, autoclave, compression molding, or the like.

In various embodiments, the method may further comprise coupling the composite laminate to the vane (step 1014). The composite laminate may be coupled to the vane by co-curing the composite laminate and the adhesive or secondary bonding with the adhesive.

Figure 8:
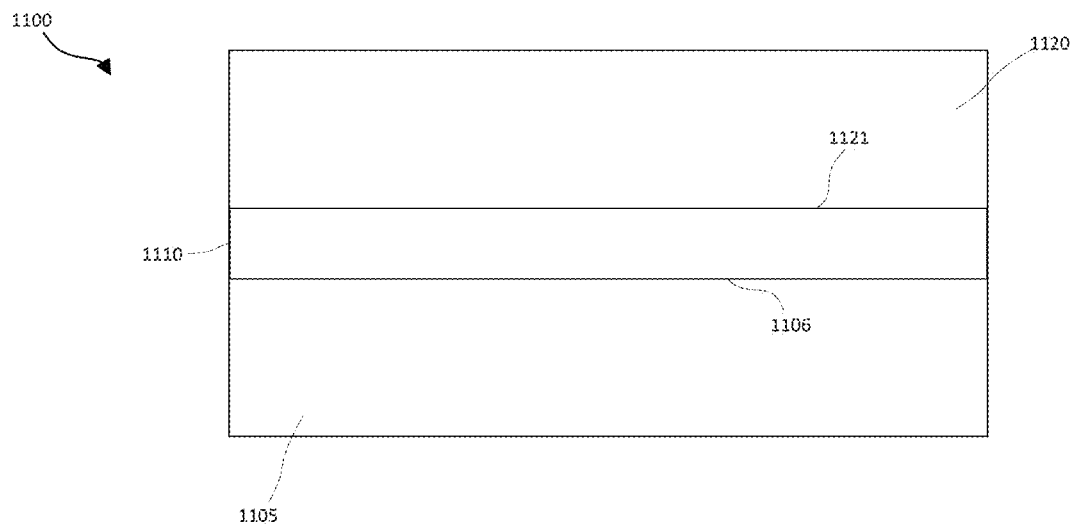
FIG. 8 illustrates a system for adhesively bonding a vane to a composite laminate, in accordance with various embodiments.

Referring to FIG. 8, in accordance with various embodiments, a system of bonded substrates 1100 is depicted comprising a first substrate 1105, an adhesive 1110, and a second substrate 1120. The first substrate may comprise a titanium alloy, as disclosed previously herein, and the second substrate may comprise a composite laminate. A first substrate contact surface 1106 of the first substrate 1105 may be treated in preparation for bonding or coupling with the adhesive 1110 by a laser surface treatment, in accordance with various embodiments in this disclosure. Similarly, the second substrate contact surface 1121 of the second substrate 1120 may be laser treated in a similar manner as the first substrate contact surface 1106. In various embodiments, only the first substrate contact surface 1106 may be treated. In various embodiments, by treating the first substrate contact surface 1106 with a laser, a highly open-pore oxide layer is formed on the first substrate contact surface 1106. The highly open-pore oxide layer may then be infiltrated with an adhesive 1110.

The adhesive 1110 may be disposed on the vane 905 and may comprise at least one nonmetallic material. The adhesive 1110 may be configured to bond two dissimilar, or similar, substrates or materials, the first substrate 1105 and the second substrate 1120, and prevent galvanic corrosion from occurring between the first substrate 1105 and the second substrate 1120 by providing an isolation layer. As used herein, the term "isolating," "isolation," or the like, may refer to electrically insulating or electrical insulation, and/or completely or substantially blocking electrical conductivity and electrochemical communication between two or more materials and/or substrates. The adhesive 1110 may be coupled to the first substrate 1105 and second substrate 1120 after surface treatment of the first substrate contact surface 1106, and the second substrate contact surface 1121. The adhesive 1110 may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven.

Figure 9:
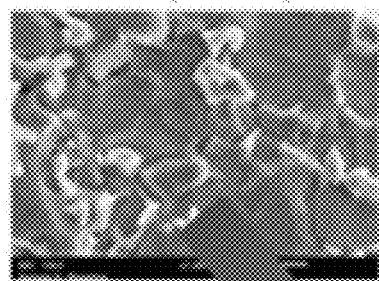
FIG. 9 illustrates a pre-bonding surface treatment of a titanium component compared to a pre-bonding surface treatment of titanium via a laser surface treatment, in accordance with various embodiments.
Figure 9:
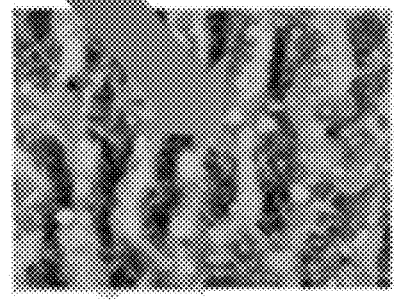

Referring now to FIG. 9, a pre-bonding surface treatment of a titanium component compared to a pre-bonding surface treatment of titanium via a laser surface treatment, as disclosed herein, is illustrated in accordance with various embodiments. Conventional pre-bonding surface treatment includes pretreating a titanium component, such as a vane, with alkaline etching and primer prior to adhesive bonding. Alkaline etching may be a high cost batch process and/or include large quantities of chemicals, tight controls to minimize batch-to-batch variation, or the like. Alkaline etching may pose concerns for pretreatment consistency and/or impact bond quality.

As shown in FIG. 9, laser surface treatments of titanium alloys, as disclosed herein, may provide substantially more uniform topographical patterns on a contact surface. In this regard, the contact surface may include increased chemical and mechanical interlocking for bonding relative to typical alkaline etching surface treatments. An oxide layer formed from the laser surface treatment may allow for formation of chemical bonds between the titanium component and organic adhesives.

In that regard, methods disclosed herein may provide a more desirable micro-roughness than surfaces formed through alkaline etching. Moreover, the maximum peak height and maximum peak depth may be more precisely created and controlled related conventional means. In that regard, the more consistent micro-roughness profile may allow for bonds that may be more resistant to shear stress or other delaminating stresses, as well bonds that are more resistant to cracking.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods and systems for the bonding of dissimilar substrates are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a composite-to-metal hybrid vane, the method comprising:
    treating a surface of a vane with a pulsed laser, the vane comprising a titanium alloy;
    generating a porous oxide layer on a contact surface of the vane;
    infiltrating the porous oxide layer with at least one of an adhesive, primer, or composite resin matrix; and
    coupling a composite laminate to the vane.

2. The method of claim 1, wherein coupling the composite laminate to the titanium alloy further comprises co-curing the composite laminate and the adhesive.

3. The method of claim 1, wherein coupling the composite laminate to the titanium alloy further comprises secondary bonding of the composite laminate with the adhesive.

4. The method of claim 1, further comprising applying the composite laminate to the adhesive prior to coupling the composite laminate to the vane.

5. The method of claim 4, wherein applying the composite laminate to the adhesive further comprises applying the composite laminate via liquid molding techniques including resin transfer molding, autoclave processing techniques, or compression molding techniques.

6. The method of claim 1, wherein infiltrating the porous oxide layer includes only the adhesive.

7. The method of claim 1, wherein treating the surface of the vane with the pulsed laser further comprises applying a pulsed laser beam to the surface of the vane along a predefined geometric pattern.

8. The method of claim 1, wherein prior to treating the surface of the vane the method comprises:
    determining a predetermined set laser path corresponding to a predefined geometric pattern; and
    applying, via a laser, a pulsed laser beam to the contact surface of the vane along the predefined geometric pattern, the pulsed laser beam configured to contact the contact surface at a substantially normal angle relative to the contact surface.

9. The method of claim 8, further comprising prior to the applying, coupling the laser to a computer numeric control (CNC) tool.

10. The method of claim 8, wherein the predetermined set laser path is a three-dimensional path corresponding to the predefined geometric pattern of the contact surface, wherein the contact surface has a complex three-dimensional surface.

11. The method of claim 8, wherein the predefined geometric pattern comprises at least one of a linear array pattern, a perpendicular crosshatch pattern, or a rotating linear array.

12. The method of claim 8, wherein a topography of the contact surface after applying the pulsed laser beam to the contact surface is more uniform relative to an alkaline etching surface treatment.

13. The method of claim 8, wherein applying the pulsed laser beam to the contact surface further comprises forming an open pore oxide structure on the contact surface.

14. The method of claim 8, wherein the laser is configured to travel along a three-dimensional path and treat a complex three-dimensional surface of the contact surface.

* * * * *